Figure 1:
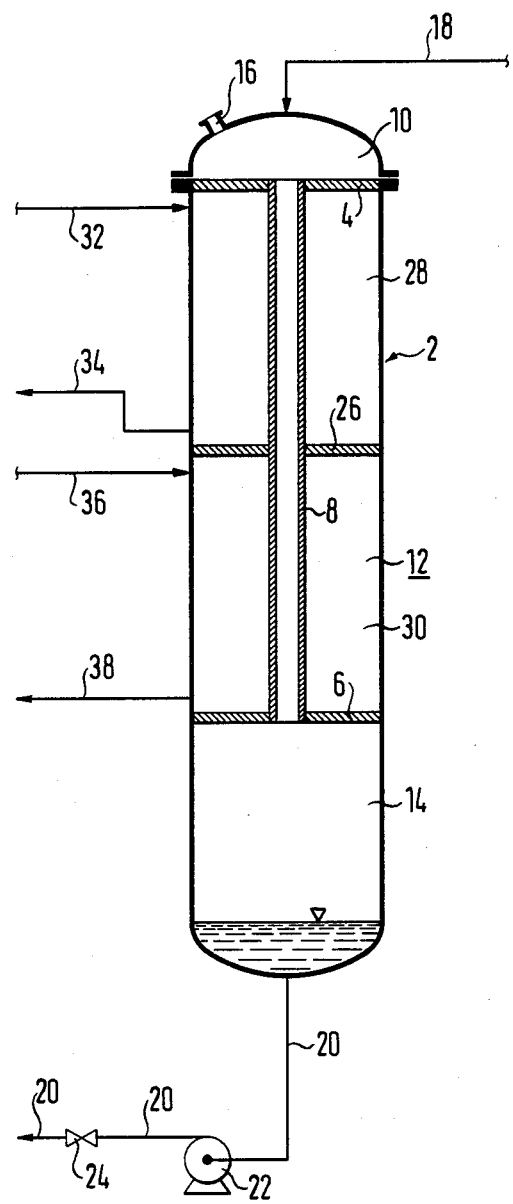

United States Patent [19]

Dümmler

[11] Patent Number: 4,762,166
[45] Date of Patent: Aug. 9, 1988

[54] METHOD FOR THE HEATING OF A FLUID AND APPARATUS FOR CARRYING OUT THE METHOD

[75] Inventor: Ulrich Dümmler, Marxzell, Fed. Rep. of Germany

[73] Assignee: GEA Wiegand GmbH, Fed. Rep. of Germany

[21] Appl. No.: 847,500

[22] Filed: Apr. 3, 1986

[30] Foreign Application Priority Data

Apr. 4, 1985 [DE] Fed. Rep. of Germany ....... 3512451

[51] Int. Cl.$^4$ .................................... F23D 15/00
[52] U.S. Cl. .................................... 165/1; 165/141; 165/146; 165/154; 422/308
[58] Field of Search .................. 422/308; 165/1, 32, 165/141, 146, 154

[56] References Cited

U.S. PATENT DOCUMENTS

| 2,498,752 | 2/1950 | Copeland | 257/56 |
| 3,322,648 | 5/1967 | Kays | 202/174 |
| 3,491,821 | 1/1970 | Graumann | 159/13 |
| 3,991,816 | 11/1976 | Klaren | 165/1 |
| 4,119,139 | 10/1978 | Klaren | 165/1 |
| 4,220,193 | 9/1980 | Klaren | 165/1 |

FOREIGN PATENT DOCUMENTS 2016288 3/1979 United Kingdom .

Primary Examiner—Carroll B. Dority, Jr.
Attorney, Agent, or Firm—Marshall, O'Toole, Gerstein, Murray & Bicknell

[57] ABSTRACT

A process and apparatus for heating a liquid in at least one vertically disposed externally heated tube on the inner surface of which the liquid flows in the form of a trickling film, characterized in that the internal space of the tube is kept under a gas pressure which is higher than the vapor pressure of the liquid in the trickling film.

8 Claims, 4 Drawing Sheets

METHOD FOR THE HEATING OF A FLUID AND APPARATUS FOR CARRYING OUT THE METHOD

The present invention relates to a process for heating a liquid in an apparatus having at least one vertically arranged tube having an internal space and an inner surface on which the liquid flows in the form of a trickling film.

The present invention also relates to an apparatus for carrying out the inventive process.

It is known to send liquids, for heating them, through a heated tube in such a manner that they fill it.

Independently thereof, it is known to let a liquid flow on the interior surface of a heated tube in the form of a trickling film, in order to evaporate the liquid. The internal space of the tube is kept for this purpose under a gas pressure which is lower than the vapour pressure of the liquid in the trickling film.

In theory, the heating of a liquid which flows down on a heated wall in the form of a trickling film has also already been considered.

It is the object of the present invention to disclose a process for heating a liquid in an apparatus having at least one vertically arranged tube having an internal space and an inner surface on which the liquid flows in the form of a trickling film which permits large heat transfer coefficients to be obtained with a short time of stay of the liquid to be heated and which does not evaporate the liquid.

Maintaining the internal space of the tube at a gas pressure higher than the vapor pressure of the liquid is a solution to this problem.

In order to make a particularly economical heating of the liquid possible, it is preferred to carry out the process in an apparatus wherein the heating temperature of the tube increases in a downward direction so as to keep the temperature differences of the tube and of the trickling film as small as possible over the whole length of the tube. This can be realized in practice preferably by an apparatus wherein the tube extends through at least two heating zones, each heating zone having a predetermined temperature with the temperature of the heating zones increasing in a downward direction.

In order to produce the different temperatures, it is preferable to heat the respective heating zones by vapors which condense at different temperatures. In an evaporating plant with several vaporizers this can be done in a particularly simple manner wherein the heating zones are each heated with vapors from different evaporators, and in a sterilization plant wherein the evaporators comprise flash evaporators.

If steam is available whose condensation temperature drops with progressing condensation, the heating zones can be heated by an apparatus including a vertical elongated container including at least tube terminating in an upper wall and a lower wall with the tube defining a liquid admission space, a heating space and a liquid discharge space. A gas admission line is connected to an adjustable gas pressure source with the gas admission line opening into one or more of the liquid admission space and the liquid discharge space. The subdivision of the heating space into the heating zones is then preferably accomplished by an intermediate wall fixed in the tube and spaced between the upper and lower walls.

Figure 2:
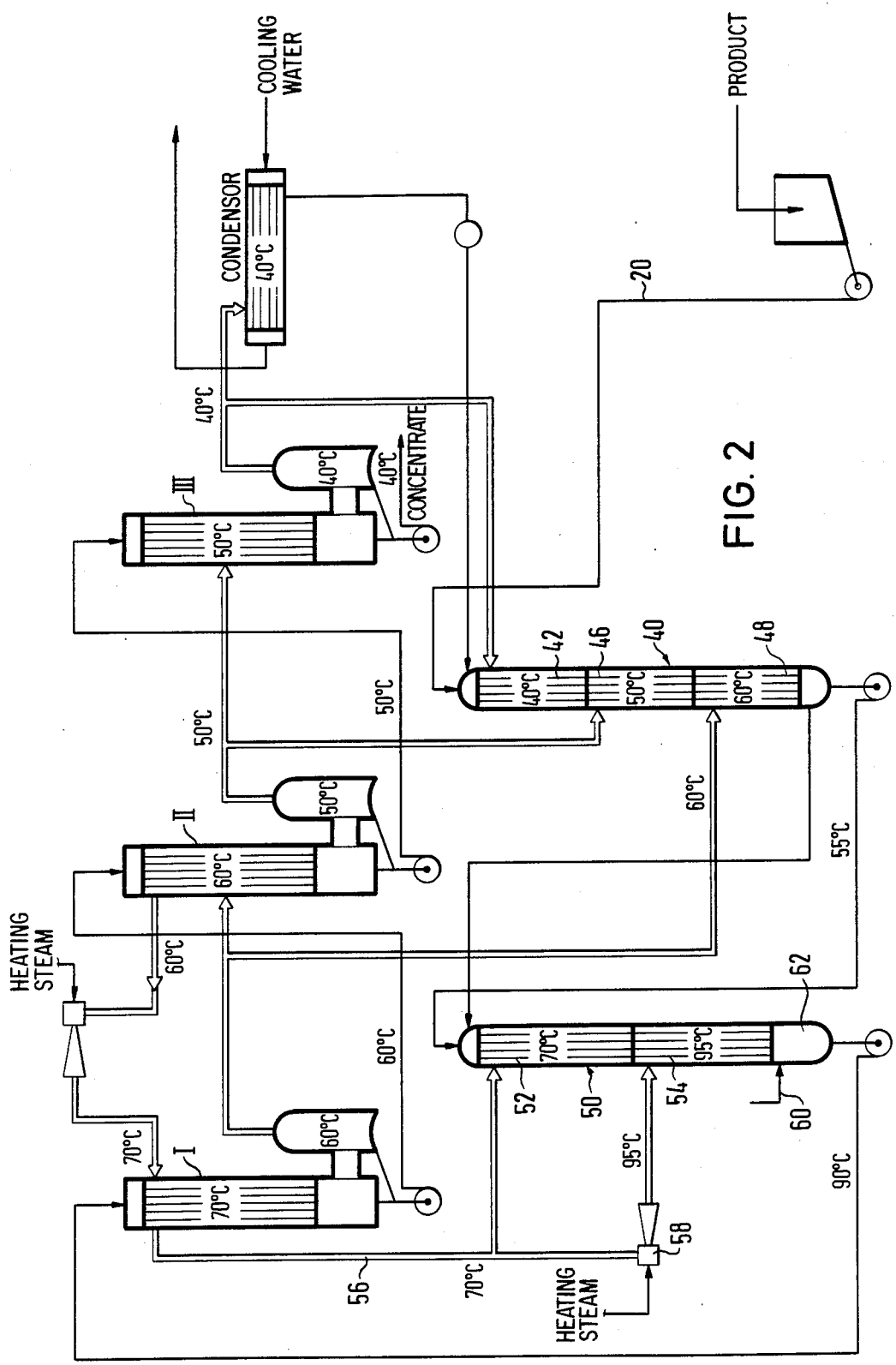
Figure 3:
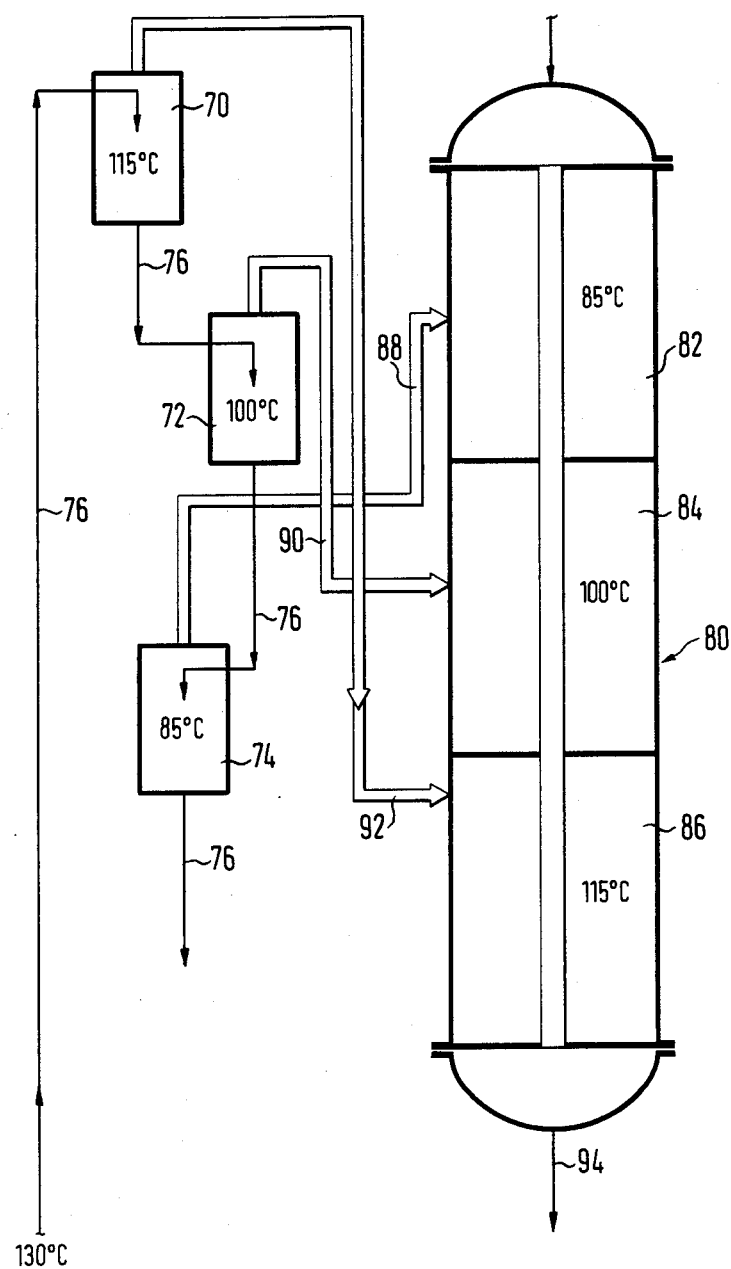
Figure 4:
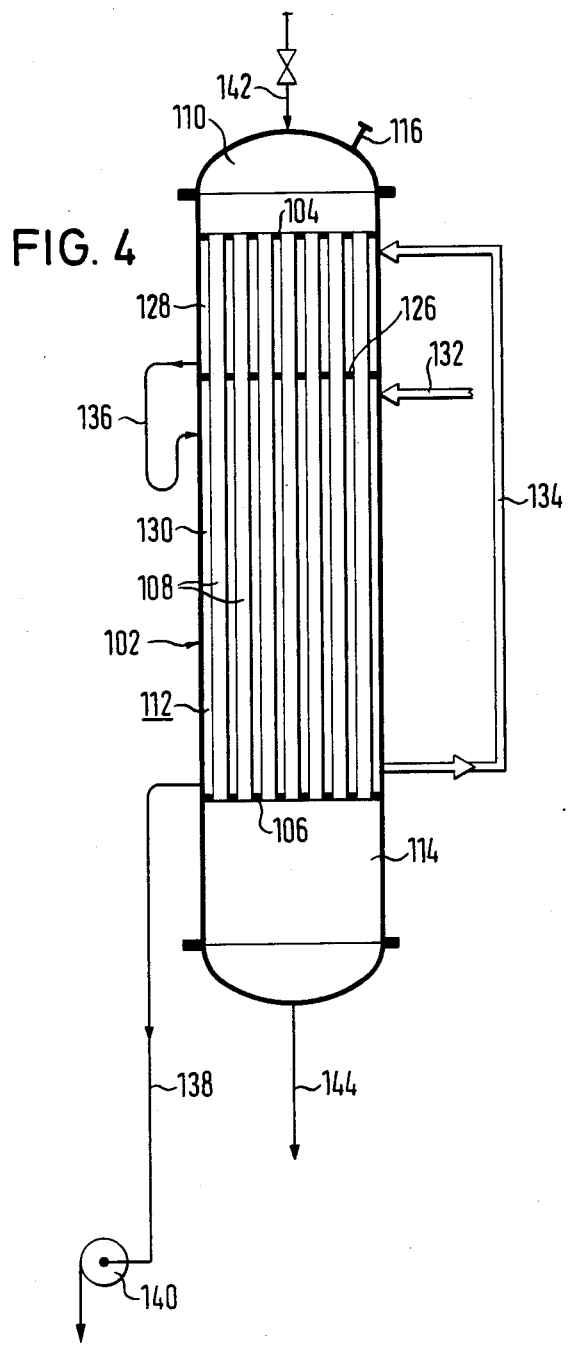

The invention will be described in the following by examples of embodiments with reference to the attached drawings, in which FIG. 1 shows schematically an apparatus for carrying out the process, FIG. 2 shows schematically an evaporating plant with an apparatus according to the invention, FIG. 3 shows schematically a sterilization plant with an apparatus according to the invention, and FIG. 4 shows another embodiment of the apparatus according to the invention.

The apparatus according to FIG. 1 comprises a vertical elongated container 2 in which are delimited a liquid admission space 10, a heating space 12 and a liquid discharge space 14 by an upper wall 4, a lower wall 6 and a tube 8 ending in the upper wall 4 and in the lower wall 6.

In this embodiment, there ends in the liquid admission space 10 a gas admission line 16 connected to a source of gas pressure with adjustable gas pressure. The liquid to be heated is fed through a conduit 18 to the liquid admission space 10 and, in case several tubes 8 are provided, can be distributed to the individual tubes 8 by means of a known distributor arrangement.

The heated liquid is discharged from the liquid discharge space 14 through a line 20 in which are arranged in succession a pump 22 and a valve 24.

Between the upper wall 4 and the lower wall 6 is placed an intermediate wall 26 which subdivides the heating space 12 into two heating zones 28, 30.

The tube 8 is preferably fixed to the intermediate wall 26. Most preferably, the tube 8 is rolled, glued, inserted or secured with rubber sleeves in the intermediate wall 26.

The upper heating zone 28 is fed via the line 32 with a heat carrier, and this heat carrier is withdrawn from the upper heating zone 28 through a conduit 34 disposed below the line 32.

Similarly, the lower heating zone 30 is fed through an upper line 36 with a heat carrier of higher temperature which is then withdrawn through a lower conduit 38.

The evaporation plant shown in FIG. 2 is known in principle and does therefore not represent per se a subject of the invention; hence it will be described only insofar as it concerns the process and the apparatus according to the invention. The temperatures in the different parts of the plant, in case milk is to be evaporated, have been entered in FIG. 2.

It can be seen that the evaporation plant contains three vaporizers I, II and III.

The product, thus in the present case the milk, is preheated in a trickling film heater 40 which has three heating zones 42, 46, 48. The uppermost heating zone 42 is heated by vapours from the evaporator III, the middle heating zone 46 by vapours from the evaporator II, and the lowest heating zone by vapours from the evaporator I. The product heated in the trickling film evaporator then reaches a second trickling film evaporator 50 with two heating zones 52, 54. The upper heating zone 52 is directly heated by heating steam discharged from the evaporator I through the conduit 56, the second heating zone 54 is heated with the steam discharged through the line 56 after heating up by means of a vapour condenser 58.

A source of gas pressure serves for maintaining in the tubes of the trickling film heater 40 a pressure which is higher than the vapour pressure of the product flowing through these tubes. In order to maintain in the tubes of the trickling film heater 50 a pressure which is higher than the vapour pressure of the product flowing through these tubes, there is provided a source of gas pressure connected through a line 60 to the liquid discharge space 62 of the trickling film heater 50.

The sterilization plant according to FIG. 3 comprises flash evaporators 70, 72, 74 which are fed in sequence through a conduit arrangement 76 with sterilized milk which has a temperature of 130° C. at the inlet of the flash evaporator 70.

A trickling film preheater 80 with the three heating zones 82, 84, 86 serves for preheating the milk.

The heating zone 82 is heated via the line 88 with vapours of the flash evaporator 74, the middle heating zone 84 via a line 90 with vapours of the flash evaporator 72 and the lower heating zone 86 via a line 92 with vapours of the flash evaporator 70. The milk discharged from the trickling film heater through a line 94 is subjected to final heating before reaching the line 76.

The apparatus according to FIG. 4 comprises a container 102 including a liquid admission space 110, a heating space 112 and a liquid discharge space 114 by an upper wall 104, a lower wall 106 and a plurality of tubes 108 ending in the upper wall 104 and in the lower wall 106. A gas admission line 116 connected to a gas pressure source with adjustable gas pressure ends in the gas admission space 110. Between the upper wall 104 and the lower wall 106 is arranged an intermediate wall 126, dividing the heating space 112 into two heating zones 130.

The lower heating zone 130 is fed via a line 132 with vapour, which is condensed in the lower range of the heating zone; vapour of lower temperature is withdrawn from the lower range of the heating zone 130 through the line 134 and introduced into the upper range of the heating zone 128.

Condensate can flow from the upper heating zone 128 into the lower heating zone 130 through the line 136. The condensate of both heating zones 128, 130 is withdrawn through the line 138 by means of a pump 140. The product to be heated is introduced through the line 142 into the liquid admission space 110 and discharged from the liquid discharge space through the line 144.

The apparatus according to FIG. 4 can also be used as condenser for the vapour admitted through the line 132, which vapour is then discharged through the line 138 as condensate. In this case, cooling water as the "product" to be heated flows through the tubes 108. If the vapour pressure of the liquid flowing through the tubes is lower than atmospheric pressure, the atmosphere can be used as a pressure source producing in the tubes a gas pressure which is higher than the vapour pressure of the liquid to be heated.

I claim:

1. A process for heating a liquid in an apparatus having at least one vertically arranged tube having an internal space and an inner surface on which said liquid flows downwardly in the form of a trickling film, said tube extending through at least two heating zones defined in said apparatus, each said heating zone having a predetermined temperature with the respective temperatures of said heating zones increasing in a downward direction, said process comprising the step of:
   maintaining the internal space of said tube at a gas pressure higher than the vapour pressure of said liquid in said trickling film.

2. The process of claim 1 wherein respective ones of said heating zones are heated by vapours which condense at different temperatures.

3. The process of claim 2 wherein said vapours are supplied by at least two evaporators wherein each said heating zone is heated with vapour from a different one of said evaporators.

4. A process for preheating milk in a sterilization plant according to the process of claim 3 wherein said evaporators comprise flash evaporators.

5. The process of claim 2 wherein said heating zones are heated by flowing said vapour sequentially therethrough with the condensation temperature of said vapour decreasing with progressing condensation.

6. An apparatus for heating a liquid comprising:
   a vertical elongated container including at least one tube opening in an upper wall and in a lower wall, said tube defining a liquid admission space, a heating space and a liquid discharge space;
   an intermediate wall spaced between said upper and lower walls and subdividing said heating space into at least two heating zones, at least one said tube extending through said intermediate wall; and,
   a gas admission line connected to an adjustable gas pressure source, said gas admission line opening into one or more of said liquid admission space and said liquid discharge space.

7. The apparatus of claim 6 wherein said intermediate wall is fixed to said tube.

8. The apparatus of claim 7 wherein said tube is rolled, glued, inserted or secured with rubber sleeves in said intermediate wall.

* * * * *